United States Patent
Brien

(10) Patent No.: US 9,315,418 B2
(45) Date of Patent: *Apr. 19, 2016

(54) PROCESS FOR DIMINISHING THE ADSORPTIVE CAPACITY OF COAL ASH

(71) Applicant: Joshua V. Brien, Lexington, KY (US)

(72) Inventor: Joshua V. Brien, Lexington, KY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/696,328

(22) Filed: Apr. 24, 2015

(65) Prior Publication Data

US 2015/0299039 A1    Oct. 22, 2015

Related U.S. Application Data

(63) Continuation of application No. 13/708,437, filed on Dec. 7, 2012, now Pat. No. 9,045,366.

(60) Provisional application No. 61/568,665, filed on Dec. 9, 2011.

(51) Int. Cl.
| | |
|---|---|
| *C04B 7/26* | (2006.01) |
| *C04B 14/00* | (2006.01) |
| *C04B 28/02* | (2006.01) |
| *C04B 20/02* | (2006.01) |
| *C04B 111/10* | (2006.01) |

(52) U.S. Cl.
CPC . *C04B 7/26* (2013.01); *C04B 14/00* (2013.01); *C04B 20/023* (2013.01); *C04B 28/02* (2013.01); *C04B 2111/1093* (2013.01); *Y02W 30/92* (2015.05)

(58) Field of Classification Search
CPC  C04B 14/00; C04B 28/02; C04B 2111/1093; C04B 7/26; C04B 20/023
See application file for complete search history.

(56) References Cited

U.S. PATENT DOCUMENTS

2012/0048466 A1*  3/2012  Eckert et al. ............... 156/336

* cited by examiner

*Primary Examiner* — John Uselding

(57) ABSTRACT

Disclosed is a process for diminishing the adsorption capacity of coal ash comprising inter alia admixing a quantity of coal ash with a quantity of latex polymer, ultimately to form a cementitious mixture. The invention is useful inter alia for relieving an environmental burden of coal ash disposal and for imparting favorable properties to the cementitious mixture.

4 Claims, No Drawings

PROCESS FOR DIMINISHING THE ADSORPTIVE CAPACITY OF COAL ASH

CROSS-REFERENCE TO RELATED APPLICATIONS

This application is a continuation application of U.S. patent application Ser. No. 13/708,437, filed on Dec. 7, 2012, which application claimed priority from U.S. Provisional Patent Application Ser. No. 61/568,665, filed on Dec. 9, 2011, which applications are incorporated by reference in their entirety.

FIELD OF THE INVENTION

The invention relates to a process for diminishing the adsorption capacity of coal ash, persistently surrounding particles of the coal ash with latex polymer, diminishing the adsorption capacity of the quantity of coal ash and thereby making the coal ash a more suitable constituent of any of a variety of cementitious materials.

BACKGROUND OF THE INVENTION

The problems associated with the use of high carbon content coal ash as a constituent material for contemporary cementitious products are well known. Scores of articles have been published regarding coal ash adsorption of air-entraining admixtures leading to inconsistent air content amongst cement pours and ultimately resulting in premature concrete failure.

Researchers have identified three distinctly different carbon types in coal ash samples taken from different ashes all considered to be "high carbon content coal ash". These microscopically identifiable carbon types are inertinite, isotropic coke and anisotropic coke. The three carbon types have distinctly different chemical and physical properties leading to different adsorption capacities for air entraining admixtures when used in cementitious systems. Variability in adsorption potential for high carbon coal ash often results in significant variability in concrete performance with regard to both slump characteristics and freeze-thaw durability. Such variation in pertinent concrete performance properties has resulted in high carbon content coal ash being excluded for use in many cementitious applications. An noteworthy exclusion criterion is that promulgated by a state agency regulating materials used in the construction of various highways, in which case, for example, the loss of ignition (LOI) for fly ash to be used in concrete is not to exceed three percent.

It is important to note the carbon materials inertinite, isotropic coke and anisotropic coke are not the only carbon components comprising coal ash with potentially detrimental consequences for use in contemporary cementitious applications. Various fly ash waste streams are also known to contain small percentages of activated carbon. Activated carbon is often injected into flue gas streams to prevent nuisance elements from being discharged to the atmosphere—with an example of a nuisance element being mercury.

In past regulatory environments, markets existed for fly ashes containing high contents of carbon—for example, coal ashes with LOI greater than three percent. During such times, one routine outlet for high carbon content fly ash was its use as feedstock to cement kilns. Various fly ashes are often high in silica-and alumina-containing compounds, making these materials valuable contributors to cement production from a technologic point of view. Although fly ash serves as a suitable raw material for cement production, new industrial emissions standards may endanger such a promising outlet for fly ash. The underlying reason is that fly ashes also contain nuisance materials such as arsenic, mercury, lead, cadmium and zinc, to name a few. When introduced to the high operating temperatures of a cement kiln, these materials have a tendency to transition into their respective vapor phases, thus becoming gaseous emissions. New emissions standards may force cement producers to seek raw materials that will not be significant contributors to unwanted gaseous pollutants. Fly ashes once destined for use in cement kilns will now likely end up in landfills. It is becoming apparent that the amended Clean Air Act in the United States and similar regulatory regimes in other jurisdictions create quite the conundrum for both the coal-fired utilities industry and the cement industry. New regulations are cleaning up the air, but these regulations are continuing to pressure industry with regard to finding outlets for waste streams.

The invention herein described is useful for diminishing negative effects associated with problematic coal ash when used either in combination with other hydraulic binders or as a hydraulic binder. Typically, problematic coal ash falls outside specifications provided by ASTM C618, Standard Specification for Coal Fly Ash and Raw or Calcined Natural Pozzolan for Use in Concrete. The invention, according to which, inter alia, coal ash and latex polymer are mixed, provides either a partial or full coating for coal ash particles which acts as a diffusion barrier, diminishing the adsorption capacity of the coal ash, thus rendering it usable in cementitious materials. Mixing problematic coal ash with any form of latex polymer, whether liquid dispersion or dispersible polymer powder, enables use of problematic coal ash in cementitious materials, providing a viable "green" alternative when compared to traditional landfilling of such problematic coal ash.

Problematic coal ash may typically result from lower process temperatures employed in coal burning processes. Such low temperatures cause coal ash morphology to differ from the morphology characteristic of coal ash produced during past regulatory regimes. Problematic coal ash resulting from lower process temperatures is likely to be more "platy" in shape, whereas coal ash which has been burned at high temperatures may appear completely fused and round. Platy particle morphology often results in increased water demand for cementitious materials, as the platy particles do not flow as well as round particles. Increased water demand often creates a number of troubles for cementitious materials, with two notable problems being increased pore diameter and increased rates of harmful ion ingress.

There is accordingly a long-felt need for a process for diminishing the adsorption capacity of coal ash.

SUMMARY OF THE INVENTION

The invention provides, inter alia, a process for diminishing the adsorption capacity of coal ash, persistently surrounding particles of the coal ash with latex polymer, diminishing the adsorption capacity of the quantity of coal ash and thereby making the coal ash a more suitable constituent of any of a variety of cementitious materials.

A process according to the invention comprises, inter alia, mixing coal ash with one or more latex polymers to form a mixture, reducing water demand and increasing the "flow" of cementitious materials formed from the mixture. Thus, a process according to the invention is useful to ensure the suitability for use in the making of cementitious materials of coal ash from any one or more of an extraordinarily wide variety of coal burning process, including coal ash from a fluidized bed combustion (FBC) process, coal ash containing large amounts of activated carbon, or, more generally, virtually any high carbon content coal ash.

In a process according to the invention, a latex polymer may in the form of a liquid dispersion or a dispersible polymer powder.

The invention is useful in that, inter alia, a product of a process according to the invention possesses favorable material flow properties even in those instances in which a process input comprises problematic coal ash having "platy" morphology.

According to the invention, a partial or full coating for coal ash particles is developed through a mixing process. A mixing process according to the invention can be in the form of a liquid mixing process or a dry powder mixing process.

A liquid or wet mixing process according to the invention may comprise mixing dry coal ash with liquid latex polymer dispersion, coal ash slurry with liquid latex polymer dispersion, dry coal ash with dispersible latex polymer powder along with a suitable liquid medium, coal ash slurry with dispersible latex polymer powder, or, more generally, contacting a plurality of coal ash particles with latex polymer while in a suitable liquid medium.

A dry mixing process according to the invention may comprise mixing dry, problematic coal ash and dispersible polymer powder. According to the invention, the mass ratio of coal ash to dispersible polymer powder in such a dry mixing process may be greater than unity. According to the invention, a coal ash particle may have any of a variety of different polarities, depending upon carbon type present. According to the invention, a dispersible polymer powder may have any of a variety of different polarities, depending upon type and constituent percentage of monomer from which the dispersible polymer powder is formed. When a suitable combination of dry coal ash and dry polymer is mixed, a coal ash particle of a first polarity may be attracted to a polymer particle of a second and opposite polarity. A resultant association of a coal ash particle of a first polarity with a polymer particle of a second and opposite polarity may possess fewer active sites available for adsorption of other component materials within a formulation.

A latex polymer according to the invention may comprise an elastomeric latex, a thermoplastic latex or a thermosetting latex or any combination thereof. An elastomeric latex may comprise a natural or a synthetic rubber. A thermoplastic latex may comprise a polyacrylic ester, a copolymer of vinyl acetate/ethylene (VAE or EVA), a terpolymer of vinyl acetate/ethylene/vinyl chloride (VAE/VC), a terpolymer of vinyl acetate/ethylene/veova (VAE/Veova), VAE/Veova/VC, a styrene acrylic, a polystyrene acrylic ester, a polyvinyl acetate, a polyvinyl propionate, a polypropylene, or a poly vinylidene chloride vinyl chloride (PVDC). A thermosetting latexes may comprise an epoxy. An example of a VAE liquid polymer dispersion is Vinnapas 526 BP or Mowilith LDM 1852. An example of a SBR liquid polymer dispersion is Axilat SB500. An example of an acrylic liquid polymer dispersion is Axilat L8840.

A dispersible polymer powder according to the invention may comprise a polymer powder that disperses readily into its constituent polymer components when exposed to water, thereby forming a tough, elastic water resistant polymer film. A dispersible powder polymer according to the invention may comprise a copolymer of vinyl acetate and ethylene. An example of a dispersible polymer powder is Vinnapas 5044N or Vinnapas 5010N. A dispersible powder polymer according to the invention may comprise a copolymer of styrene and butadiene. An example of a dispersible polymer powder is Axilat PSB150.

In a process according to the invention, coal ash and latex polymer may be mixed with, inter alia, a composition comprising a hydraulic binder. According to the invention, the term "hydraulic binder" refers to a pulverized material in the solid, dry state, which when mixed with water yields mixtures which are able to set and harden, with a common example being the term "cement". A hydraulic binder may comprise one or more individual component materials. A hydraulic binder may undergo setting and hardening when exposed to suitable medium. Utilizing cement chemistry nomenclature where $C=CaO$, $\acute{S}=SO_3$, $S=SiO_2$, $A=Al_2O_3$, $H=H_2O$, $F=Fe_2O_3$, N=sodium based materials, K=potassium based materials, any of such hydraulic binder materials may hydrate to form materials containing C—A—$\acute{S}$—H type phases and (N,K)—A—$\acute{S}$—H type phases in addition to more traditional type phases common to ordinary portland cement hydration. Examples of such individual component materials should not be limited to all forms of calcium sulfate, hydrated lime, quicklime, alumina, alumina tri-hydrate, alite, belite, tri-calcium aluminate, yeelimite (kleins compound), calcium aluminate, $C_{12}A_7$, coal ash, slag, silica fume, pozzolana, clay, bauxite, red mud, brownmillerite or any other suitable material or combination of materials which when exposed to water or other suitable medium is able to set and harden. The term "cement" includes hydraulic and alite cements such as portland cement, blended cement, slag cement, pozzolanic cement, calcium aluminate cement, calcium sulfoaluminate cement or any other common cementing material or combination thereof In a process according to the invention, coal ash and latex polymer may be mixed with, inter alia, a composition comprising a viscosity modifier. For example, a viscosity modifier commonly used in cementitious systems may be mixed with coal ash and polymer. A viscosity modifier may comprise a polysaccharide or a polysaccharide derivative, including a polysaccharide ether soluble in water, such as cellulose ether, starch ether (amylose and/or amylopectin and/or a derivative of amylose and/or amylopectin), guar ether and/or a dextrin. A viscosity modifier may comprise a synthetic polysaccharide such as an anionic, a non-ionic or a cationic heteropolysaccharide, such as xanthan gum or wellan gum. A polysaccharide may, but need not, be chemically modified with one or more carboxymethyl groups, carboxyethyl groups, hydroxyethyl groups, hydroxypropyl groups, methyl groups, ethyl groups, propyl groups and/or long chain alkyl groups. A viscosity modifier may comprise one or more alginates, peptides and/or proteins such as gelatin, casein and/or soy protein. A viscosity modifier may comprise one or more dextrins, starch, starch ether, casein, soy protein, hydroxyl alkyl cellulose and/or alkyl hydroxalkyl cellulose. A viscosity modifier may comprise one or several polyvinyl pyrrolidones and/or polyvinyl acetals having molecular weights of approximately 2000 to 400,000; fully or partially saponified and/or modified fully or partially saponified poly-vinyl alcohols with a degree of hydrolysis of approximately 70 to 100 mole %, or in another respect approximately 80 to 98 mole %. A viscosity modifier may comprise methylhydroxyethylcellulose, hydroxymethylethylcellulose, hydroxyethylmethylcellulose, HEMC, carboxymethylcellulose, methylcellulose, ethylcellulose, hydroxyethylcellulose, or hydroxyethylpropylcellulose.

In a process according to the invention, coal ash and latex polymer may be mixed with, inter alia, a composition comprising a plasticizer, a super-plasticizer, a high range water reducer or a similar such material. For example, coal ash and polymer may be mixed with, inter alia, melamine sulphonate formaldehyde condensates, naphthalene sulphonates, calcium lignosulphonates, sodium lignosulphonates, saccharose, sodium gluconate, sulphonic acids, carboxylates, polycarboxylates, carboxylic acids, polyhydroxycarboxilic acids, sulphonated melamine, polycarboxylate ethers, spray dried polycarboxylate ethers, or any other suitable material, whether it be naturally occurring or processed. For example, coal ash and polymer may be mixed with, inter alia, one or members of the Glennium family of products or the Melflux family of products.

In a process according to the invention, coal ash and latex polymer may be mixed with, inter alia, a composition comprising a set retarder. A set retarder may be used to delay hydration reactions associated with hydraulic binders and possibly reactions of other constituent components. In addition to numerous other possibilities for interactions with various chemical compounds, compounds acting as "chelating agents" are known to be effective set retarders. Set retarders can vary in effectiveness of delaying onset or rapidity of hydration for differing hydraulic binders and/or different or varying combinations of constituent materials. A set retarder may comprise, for example, tartaric acid, citric acid, sodium citrate, sodium borate, a hydroxyl carboxylic acid or a hydroxyl carboxylic acid salt, malic acid, sodium gluconate, or sucrose.

In a process according to the invention, coal ash and latex polymer may be mixed with, inter alia, a composition comprising a set accelerator or an accelerating admixture. A set accelerator or an accelerating admixture may be used, for example, to increase a rate of a hydration reaction or to provide a means of control for one or more specific interactions which are inevitable when certain materials interact under certain conditions. Common examples of set accelerators or accelerating admixtures include but are not limited to lithium carbonate, calcium formate, quicklime, calcium oxide, sodium chloride, various alkali earth metals and their salts, and aluminous materials when combined with other proper constituents.

In a process according to the invention, coal ash and latex polymer may be mixed with, inter alia, a composition comprising a surfactant. Surfactants are used for various purposes, whether they be used as foaming materials or defoaming materials or to provide any other desired properties. Suitable foaming and stabilizing surfactants may include but are not limited to mixtures of an ammonium salt of an alkyl ether sulfate, a cocoamidopropyl betaine surfactant, a cocoamidopropyl dimethylamine, oxide surfactant, mixtures of an ammonium salt of an alkyl ether sulfate surfactant, a cocoamidopropyl hydroxysultaine surfactant, hydrolyzed keratin, an alkyl or alkene dimethylamine oxide surfactant, aqueous solutions of an alpha-olefinic sulfonate surfactant and a betaine surfactant and/or any other suitable materials. An example of a foaming material is ZONESEAL 2000 foaming additive commercially available from Halliburton.

In a process according to the invention, coal ash and latex polymer may be mixed with, inter alia, a composition comprising one or more defoaming materials which also may be known as air detrainers. These types of defoaming materials can be very important for creating impermeable coatings. These defoaming materials typically decrease the amount of entrained air within the designed system. Common examples of these materials are tributyl phosphate dibutyl phthalate, octyl alcohol, water insoluble esters of carbonic and boric acid as well as silicone based materials. Common examples of available defoamers include but are not limited to Agitan P803 and Surfynol MD600.

In a process according to the invention, coal ash and latex polymer may be mixed with, inter alia, a composition comprising one or more "fugitive plasticizers" or "coalescing solvents" with a primary function being not limited to aiding the mechanisms for facilitating film formation or film integration during either the drying, setting, hardening or overall curing process. Some common "fugitive plasticizers" or "coalescing solvents" are volatile organic compounds not being limited to the examples including toluene, xylene, n-butyl acetate, ethoxyethyl acetate, ethyleneglycol monobutyl ether acetate, and diethyleneglycol monobutyl ether acetate.

In a process according to the invention, coal ash and latex polymer may be mixed with, inter alia, a composition comprising one or more filling materials. Typically, filling materials are finely ground materials. These fillers often possess, but should not be limited to a particle size distribution with both median and mean values less than 100 microns. This is one classification characteristic when comparing fillers and aggregate. Examples of common filling materials or fillers are ground carbonates with examples being calcium carbonate and sodium bi-carbonate, all classifications of clay materials, metakaolin, diatomaceous earth, carbon black, activated carbon, titanium dioxide, finely ground silica based materials often referred to as micro-silica, silica fume, fumed silica, kiln dust, pulverized stone, pulverized glass, ultra fine fly ash, fly ash, blast furnace slag, ground granulated blast furnace slag (GGBS), ground recycled materials, pulverized glass, crum rubber, recycled tires, powdered waste from recycling automobiles, powdered waste from recycling electronic components, etc.

In a process according to the invention, coal ash and latex polymer may be mixed with, inter alia, a composition comprising one or more common reinforcing materials typically used in either cementitious materials design or coating materials design such as fibrous materials or mesh type materials. Examples of fiber type materials should not be limited to metal fibers, organic fibers or a mixture of metal and organic fibers. Examples of organic fibers should not be limited to polyvinyl alcohol fibers (PVA), polyacrylonitrile fibers (PAN), polyethylene fibers (PE), high density polyethylene fibers (HDPE), polypropylene fibers (PP) or homo or co-polymers of polyamide or polyimide. Mixtures of any type of fibers may also be used, especially mixtures of fibers with different physical dimensions. Addition of fibrous material to cementitious type mixtures may be facilitated by use of a viscosity modifying agent which ensures proper dispersal of fibers throughout the mixture, with an example being Kelco-Crete which is an anionic polysaccharide from CP Kelco. Furthermore, aramid type fibers, such as fibers with AABB configuration, with examples not being limited to Kevlar, Twaron, Nomex, New Star and Teijinconex, may be included in a multitude of possible arrays. Additionally, novel materials such as combinations of boron oxides and polyethylene may be utilized as means of reinforcement. Mesh type materials may also be used as a means of reinforcement. Examples of mesh type materials should not be limited to fiberglass mesh, polyethylene mesh or Kevlar mesh.

In a process according to the invention, coal ash and latex polymer may be mixed with, inter alia, a composition comprising one or more materials sometimes needed for protection from microorganism attack. In a process according to the invention, coal ash and latex polymer may accordingly be mixed with, inter alia, one or more or antibacterial substances. Examples of such materials should not be limited to pentachlorophenol, sodium o-phenylphenate and/or various organic mercury compounds.

In a process according to the invention, coal ash and latex polymer may be mixed with, inter alia, a composition comprising one or more flame-retarding materials. Examples of flame retarding materials should not be limited to chlorinated paraffin waxes and antimony trioxide.

In a process according to the invention, coal ash and latex polymer may be mixed with, inter alia, a composition comprising one or more common aggregate materials not limited to specification of chemical composition or specimen geometry. Examples of common aggregate materials are siliceous materials, with one specific example being silica sand, calcium based materials, with an example being limestone, river gravel, river sand, pea gravel, pozzolanic material, with an example being volcanic rock, bottom ash, cinders, along with numerous other possibilities for both recycled and manufactured aggregates.

In a process according to the invention, coal ash and latex polymer may be mixed with, inter alia, a composition comprising one or more antioxidants to retard deterioration of polymeric materials, and optionally surface active substances to enhance colloidal stability and ability to "wet out" surfaces. Often times, coating materials may become exposed to acidic materials on the molecular level due to consequences from polymer hydrolysis, with one example being the liberation of hydrogen chloride. Common anti-oxidant materials should not be limited to phenyl-2-naphthylamine or carbon black. Common acid accepting substances for mix design purposes should not be limited to zinc oxide and calcium carbonate.

In a process according to the invention, coal ash and latex polymer may be mixed with, inter alia, a composition comprising one or more anti-freeze materials not limited to ethylene glycol or glycerol.

In a process according to the invention, coal ash and latex polymer may be mixed with, inter alia, a composition comprising one or more corrosion inhibiting substances with one example not being limited to sodium benzoate.

In a process according to the invention, coal ash and latex polymer may be mixed with, inter alia, a composition comprising one or more powdered metals, powdered alloys or powdered conductive materials for the purposes of producing a coating capable of conducting either electron, proton or neutron transfer in either continuous or discontinuous fashion. In a process according to the invention, coal ash and latex polymer may be mixed with, inter alia, a composition comprising one or more conductive materials not be limited to powder form, as such conductive materials may also be mixed in the form of fibrous material, platey material, ground material, spherical material or virtually any geometry required for the given degree of conductivity.

In a process according to the invention, coal ash and latex polymer may be mixed with, inter alia, a composition comprising one or more pigments, dyes or other common color enhancing additives.

In a process according to the invention, coal ash and latex polymer may be mixed with, inter alia, a composition comprising one or more alkali activating agents or polymer cross-linking agents. Examples of alkali activating agents should not be limited to sodium hydroxide, potassium hydroxide or magnesium hydroxide. Polymer cross-linking agents should not be limited to sodium borate and maleic anhydrite.

DETAILED DESCRIPTION OF THE PREFERRED EMBODIMENTS

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art. As used in this specification and the claims, the singular forms "a," "an," and "the" include plural referents unless the context clearly dictates otherwise.

In an embodiment, the invention provides formation of a dry coal ash and liquid latex polymer dispersion such that the mass ratio of coal ash to polymer solids (or effective polymeric material amount) is within the range of 0.03/1 to 10000/1.

In an embodiment, the invention provides formation of a dry coal ash, hydraulic binder and liquid latex polymer dispersion such that the mass ratio of coal ash to polymer solids (or effective polymeric material amount) is within the range of 0.03/1 to 10000/1 independent of other constituent materials.

In an embodiment, the invention comprises formation of a dry coal ash, hydraulic binder, aggregate and liquid latex polymer dispersion such that the mass ratio of coal ash to polymer solids (or effective polymeric material amount) is within the range of 0.03/1 to 10000/1 independent of other constituent materials.

In an embodiment, the invention provides formation of a dry coal ash, hydraulic binder, filling material and liquid latex polymer dispersion such that the mass ratio of coal ash to polymer solids (or effective polymeric material amount) is within the range of 0.03/1 to 10000/1 independent of other constituent materials.

In an embodiment, the invention provides formation of a dry coal ash, hydraulic binder, rheology modifier and liquid latex polymer dispersion such that the mass ratio of coal ash to polymer solids (or effective polymeric material amount) is within the range of 0.03/1 to 10000/1 independent of other constituent materials.

In an embodiment, the invention provides formation of a dry coal ash, hydraulic binder, rheology modifier, accelerating admixture and liquid latex polymer dispersion such that the mass ratio of coal ash to polymer solids (or effective polymeric material amount) is within the range of 0.03/1 to 10000/1 independent of other constituent materials.

In an embodiment, the invention provides formation of a dry coal ash, hydraulic binder, rheology modifier, accelerating admixture, retarding admixture and liquid latex polymer dispersion such that the mass ratio of coal ash to polymer solids (or effective polymeric material amount) is within the range of 0.03/1 to 10000/1 independent of other constituent materials.

In an embodiment, the invention provides formation of any combination of the materials dry coal ash, hydraulic binder, aggregate, filling material, rheology modifier, accelerating admixture, retarding admixture, fugitive plasticizer, plasticizing agent, super-plasiticizing agent, foaming agent, defoaming agent, pigment, dye, alkali activating agents and liquid latex polymer dispersion such that the mass ratio of coal ash to polymer solids (or effective polymeric material amount) is within the range of 0.03/1 to 10000/1 independent of other constituent materials.

In an embodiment, the invention provides formation of a coal ash slurry (or slurry containing coal ash) and liquid latex polymer dispersion.

In an embodiment, the invention provides formation of a coal ash slurry (or slurry containing coal ash), hydraulic binder and liquid latex polymer dispersion.

In an embodiment, the invention provides formation of a coal ash slurry (or slurry containing coal ash), hydraulic binder, filling material and liquid latex polymer dispersion.

In an embodiment, the invention provides formation of a coal ash slurry (or slurry containing coal ash), hydraulic binder, rheology modifier and liquid latex polymer dispersion.

In an embodiment, the invention provides formation of a coal ash slurry (or slurry containing coal ash), hydraulic binder, aggregate, rheology modifier and liquid latex polymer dispersion.

In an embodiment, the invention provides formation of a coal ash slurry (or slurry containing coal ash), hydraulic binder, aggregate, filling material, rheology modifier and liquid latex polymer dispersion.

In an embodiment, the invention provides formation of a coal ash slurry (or slurry containing coal ash), hydraulic binder, rheology modifier, accelerating admixture and liquid latex polymer dispersion.

In an embodiment, the invention provides formation of a coal ash slurry (or slurry containing coal ash), hydraulic binder, rheology modifier, accelerating admixture, retarding admixture and liquid latex polymer dispersion.

In an embodiment, the invention provides formation of a dry coal ash and dispersible polymer powder mixture such that ratio of coal ash to dispersible polymer powder is greater than unity.

In an embodiment, the invention provides formation of a slurry containing coal ash and dispersible polymer powder in suitable medium.

In an embodiment, the invention provides formation of any combination of the materials dry coal ash, dispersible polymer powder, hydraulic binder, aggregate, filling material, rheology modifier, accelerating admixture, retarding admixture, fugitive plasticizer, plasticizing agent, super-plasiticizing agent, foaming agent, de-foaming agent, pigment, dye, alkali activating agents and liquid latex polymer dispersion such that the mass ratio of coal ash to polymer solids (or effective polymeric material amount) is within the range of 0.03/1 to 10000/1 independent of other constituent materials.

In an embodiment, the invention provides formation of any combination of the materials coal ash slurry, dispersible polymer powder, hydraulic binder, aggregate, filling material, rheology modifier, accelerating admixture, retarding admixture, fugitive plasticizer, plasticizing agent, super-plasiticizing agent, foaming agent, de-foaming agent, pigment, dye, alkali activating agents and liquid latex polymer dispersion such that the mass ratio of coal ash to polymer solids (or effective polymeric material amount) is within the range of 0.03/1 to 10000/1 independent of other constituent materials.

In an embodiment, the invention provides formation of produced dry mix materials containing problematic coal ash and dispersible polymer powder such that the ratio of problematic coal ash to dispersible polymer powder is greater than unity independent of other constituent materials comprising the dry mix material recipe.

In an embodiment, the invention provides formation of dry mix materials where individual components may be packaged separately and sold as a "bundle" such that the ratio of problematic coal ash to dispersible polymer powder is greater than unity independent of other constituent materials comprising either the dry mix material recipe or the "bundle" recipe.

EXAMPLES

Aspects of the present invention are more fully illustrated by the following examples, set forth to illustrate certain aspects of the present invention and not to be construed as limiting thereof.

While not wishing to be bound by theory, the applicant has recognized that a vinyl acetate/ethylene based (latex) polymeric material appears to encapsulate each of a plurality of coal ash particles as a result of a process according to the invention in which coal ash is mixed with such a latex polymer.

Activated carbon particles are used in power plants to adsorb mercury and perhaps adsorb other toxins before such toxins are released to the atmosphere. Activated carbon particles injected into power plant processes for such atmospheric purposes then become part of the coal ash waste stream and sometimes are present in coal ash waste streams at significant percentages. Aside from other forms of carbon comprising the coal ash, often times the presence of activated carbon in the coal ash waste stream renders the coal ash "problematic". Activated carbon will subsequently adsorb other important constituent materials in marketable materials, preferably cementitious materials, containing such problematic coal ash.

A polymer film developed by a process according to the invention creates a diffusion barrier for an activated carbon particle encapsulated within the film, thus reducing the overall capacity of the activated carbon particle for adsorption. That is, the polymer coating will influence the rate at which materials are able to be adsorbed by the activated carbon particle.

Through study of electron micrographic images of products made by a process according to the invention, and other analytical techniques, the applicant has determined that adsorptive surface area of each of a plurality of carbon particles is diminished by a process according to the invention: a plurality of rough carbon particles each with a large amount of adsorptive surface area are coated by polymer to yield a product comprising a plurality of smoother polymer-coated particles.

The invention will be further understood by reference to the following Further non-limiting examples, which are presented for illustrative purposes only.

Further example 1. A process for diminishing the adsorption capacity of a quantity of coal ash (in either solid or slurry form), the process comprising:
  (a) admixing the quantity of coal ash with a quantity of a latex polymer (dispersible polymer powder or liquid dispersion) to form a first mixture;
  (b) slaking the first mixture;
  (c) admixing the first mixture with a cementitious substance to form a cementitious mixture; and
  (d) slaking the cementitious mixture;
thereby persistently surrounding each of a plurality of particles of the quantity of coal ash with at least a portion of the quantity of the latex polymer, diminishing the adsorption capacity of the quantity of coal ash.

Further example 2. A process according to Further example 1, wherein the ratio of the mass of the quantity of coal ash to the mass of the quantity of the latex polymer is between about 0.03:1 and about 10,000:1.

Further example 3. A process according to Further example 1, wherein the ratio of the mass of the quantity of coal ash to the mass of the quantity of the latex polymer is between about 0.05:1 and about 8,000:1.

Further example 4. A process according to Further example 1, wherein the ratio of the mass of the quantity of coal ash to the mass of the quantity of the latex polymer is between about 0.10:1 and about 6,000:1.

Further example 5. A process according to Further example 1, wherein the ratio of the mass of the quantity of coal ash to the mass of the quantity of the latex polymer is between about 0.15:1 and about 4,000:1.

Further example 6. A process according to Further example 1, wherein the ratio of the mass of the quantity of coal ash to the mass of the quantity of the latex polymer is between about 0.20:1 and about 2,000:1.

Further example 7. A process according to Further example 1, wherein the ratio of the mass of the quantity of coal ash to the mass of the quantity of the latex polymer is between about 0.25:1 and about 1,000:1.

Further example 8. A process according to Further example 1, wherein the ratio of the mass of the quantity of coal ash to the mass of the quantity of the latex polymer is between about 0.30:1 and about 500:1.

Further example 9. A process according to Further example 1, wherein the ratio of the mass of the quantity of coal ash to the mass of the quantity of the latex polymer is between about 0.35:1 and about 250:1.

Further example 10. A process according to Further example 1, wherein the ratio of the mass of the quantity of coal ash to the mass of the quantity of the latex polymer is between about 0.40:1 and about 100:1.

Further example 11. A process according to Further example 1, wherein the ratio of the mass of the quantity of coal ash to the mass of the quantity of the latex polymer is between about 0.45:1 and about 90:1.

Further example 12. A process according to Further example 1, wherein the ratio of the mass of the quantity of coal ash to the mass of the quantity of the latex polymer is between about 0.50:1 and about 80:1.

Further example 13. A process according to Further example 1, wherein the ratio of the mass of the quantity of coal ash to the mass of the quantity of the latex polymer is between about 0.55:1 and about 70:1.

Further example 14. A process according to Further example 1, wherein the ratio of the mass of the quantity of coal ash to the mass of the quantity of the latex polymer is between about 0.60:1 and about 60:1.

Further example 15. A process according to Further example 1, wherein the ratio of the mass of the quantity of coal ash to the mass of the quantity of the latex polymer is between about 0.65:1 and about 50:1.

Further example 16. A process according to Further example 1, wherein the ratio of the mass of the quantity of coal ash to the mass of the quantity of the latex polymer is between about 0.70:1 and about 40:1.

Further example 17. A process according to Further example 1, wherein the ratio of the mass of the quantity of coal ash to the mass of the quantity of the latex polymer is between about 0.75:1 and about 30:1.

Further example 18. A process according to Further example 1, wherein the ratio of the mass of the quantity of coal ash to the mass of the quantity of the latex polymer is between about 0.80:1 and about 20:1.

Further example 19. A process according to Further example 1, wherein the ratio of the mass of the quantity of coal ash to the mass of the quantity of the latex polymer is between about 0.85:1 and about 10:1.

Further example 20. A process according to Further example 1, wherein the ratio of the mass of the quantity of coal ash to the mass of the quantity of the latex polymer is between about 0.90:1 and about 5:1.

Further example 21. A process for forming a cementitious dispersion comprising coal ash and latex polymer, the process comprising admixing a quantity of coal ash and a quantity of latex polymer to form the dispersion; wherein the mass ratio of the quantity of coal ash to the quantity of latex polymer is between about 0.03/1 and about 10000/1.

Further example 22. A process for forming a cementitious dispersion comprising coal ash, latex polymer and hydraulic binder, the process comprising admixing a quantity of coal ash and a quantity of latex polymer and a quantity of hydraulic binder to form the dispersion; wherein the mass ratio of the quantity of coal ash to the quantity of latex polymer is between about 0.03/1 and about 10000/1.

Further example 23. A process for forming a cementitious dispersion comprising coal ash, latex polymer, alkali activator and hydraulic binder, the process comprising admixing a quantity of coal ash and a quantity of latex polymer and a quantity of hydraulic binder and a quantity of alkali activator to form the dispersion; wherein the mass ratio of the quantity of coal ash to the quantity of latex polymer is between about 0.03/1 and about 10000/1.

Further example 24. A process for forming a cementitious dispersion comprising coal ash, latex polymer, alkali activator, retarding admixture and hydraulic binder, the process comprising admixing a quantity of coal ash and a quantity of latex polymer and a quantity of hydraulic binder and a quantity of alkali activator and a quantity of retarding admixture to form the dispersion; wherein the mass ratio of the quantity of coal ash to the quantity of latex polymer is between about 0.03/1 and about 10000/1.

Further example 25. A process for forming a cementitious dispersion comprising coal ash, latex polymer, alkali activator, retarding admixture, accelerating admixture and hydraulic binder, the process comprising admixing a quantity of coal ash and a quantity of latex polymer and a quantity of hydraulic binder and a quantity of alkali activator and a quantity of retarding admixture and a quantity of accelerating admixture to form the dispersion; wherein the mass ratio of the quantity of coal ash to the quantity of latex polymer is between about 0.03/1 and about 10000/1.

Further example 26. A process for forming a cementitious dispersion comprising coal ash, latex polymer, alkali activator, retarding admixture, accelerating admixture, rheology modifier and hydraulic binder, the process comprising admixing a quantity of coal ash and a quantity of latex polymer and a quantity of hydraulic binder and a quantity of alkali activator and a quantity of retarding admixture and a quantity of accelerating admixture and a quantity of rheology modifier to form the dispersion; wherein the mass ratio of the quantity of coal ash to the quantity of latex polymer is between about 0.03/1 and about 10000/1.

Further example 27. A process for forming a cementitious dispersion comprising coal ash, latex polymer, alkali activator, retarding admixture, accelerating admixture, rheology modifier, plasticizer and hydraulic binder, the process comprising admixing a quantity of coal ash and a quantity of latex polymer and a quantity of alkali activator and a quantity of retarding admixture and a quantity of accelerating admixture and a quantity of rheology modifier and a quantity of plasticizer and a quantity of hydraulic binder to form the dispersion; wherein the mass ratio of the quantity of coal ash to the quantity of latex polymer is between about 0.03/1 and about 10000/1.

Further example 28. A process for forming a cementitious dispersion comprising coal ash, latex polymer, hydraulic binder and aggregate, the process comprising admixing a quantity of coal ash and a quantity of latex polymer and a quantity of hydraulic binder and a quantity of aggregate to form the dispersion; wherein the mass ratio of the quantity of coal ash to the quantity of latex polymer is between about 0.03/1 and about 10000/1.

Further example 29. A process for forming a cementitious dispersion comprising coal ash, latex polymer, hydraulic binder and filling material, the process comprising admixing a quantity of coal ash and a quantity of latex polymer and a quantity of hydraulic binder and a quantity of filling material to form the dispersion; wherein the mass ratio of the quantity of coal ash to the quantity of latex polymer is between about 0.03/1 and about 10000/1.

Further example 30. A process for forming a cementitious dispersion comprising coal ash, latex polymer, hydraulic binder and rheology modifier, the process comprising admixing a quantity of coal ash and a quantity of latex polymer and a quantity of hydraulic binder and a quantity of rheology modifier to form the dispersion; wherein the mass ratio of the quantity of coal ash to the quantity of latex polymer is between about 0.03/1 and about 10000/1.

Further example 31. A process for forming a cementitious dispersion comprising coal ash, latex polymer, hydraulic binder, accelerating admixture and rheology modifier, the process comprising admixing a quantity of coal ash and a quantity of latex polymer and a quantity of hydraulic binder and a quantity of accelerating admixture and a quantity of rheology modifier to form the dispersion; wherein the mass ratio of the quantity of coal ash to the quantity of latex polymer is between about 0.03/1 and about 10000/1.

Further example 32. A process for forming a cementitious dispersion comprising coal ash, latex polymer, hydraulic binder, accelerating admixture, retarding admixture and rheology modifier, the process comprising admixing a quantity of coal ash and a quantity of latex polymer and a quantity of hydraulic binder and a quantity of accelerating admixture and a quantity of retarding admixture and a quantity of rheology modifier to form the dispersion; wherein the mass ratio of the quantity of coal ash to the quantity of latex polymer is between about 0.03/1 and about 10000/1.

Further example 33. A process for forming a cementitious dispersion comprising coal ash, latex polymer, hydraulic binder, accelerating admixture, retarding admixture, rheology modifier, fugitive plasticizer, plasticizing agent, super-plasticizing agent, foaming agent, de-foaming agent, pigment, dye, and alkali activating agent, the process comprising admixing a quantity of coal ash and a quantity of latex polymer and a quantity of hydraulic binder and a quantity of accelerating admixture and a quantity of retarding admixture and a quantity of rheology modifier and a quantity of fugitive plasticizer and a quantity of plasticizing agent and a quantity of super-plasticizing agent and a quantity of foaming agent and a quantity of de-foaming agent and a quantity of pigment and a quantity of dye and a quantity of alkali activating agent to form the dispersion; wherein the mass ratio of the quantity of coal ash to the quantity of latex polymer is between about 0.03/1 and about 10000/1.

Further example 34. A process for forming a cementitious dispersion comprising dry coal ash and latex polymer, the process comprising admixing a quantity of dry coal ash and a quantity of latex polymer to form the dispersion; wherein the mass ratio of the quantity of dry coal ash to the quantity of latex polymer is between about 0.03/1 and about 10000/1.

Further example 35. A process for forming a cementitious dispersion comprising dry coal ash, latex polymer and hydraulic binder, the process comprising admixing a quantity of dry coal ash and a quantity of latex polymer and a quantity of hydraulic binder to form the dispersion; wherein the mass ratio of the quantity of dry coal ash to the quantity of latex polymer is between about 0.03/1 and about 10000/1.

Further example 36. A process for forming a cementitious dispersion comprising dry coal ash, latex polymer, hydraulic binder and aggregate, the process comprising admixing a quantity of dry coal ash and a quantity of latex polymer and a quantity of hydraulic binder and a quantity of aggregate to form the dispersion; wherein the mass ratio of the quantity of dry coal ash to the quantity of latex polymer is between about 0.03/1 and about 10000/1.

Further example 37. A process for forming a cementitious dispersion comprising dry coal ash, latex polymer, hydraulic binder and filling material, the process comprising admixing a quantity of dry coal ash and a quantity of latex polymer and a quantity of hydraulic binder and a quantity of filling material to form the dispersion; wherein the mass ratio of the quantity of dry coal ash to the quantity of latex polymer is between about 0.03/1 and about 10000/1.

Further example 38. A process for forming a cementitious dispersion comprising dry coal ash, latex polymer, hydraulic binder and rheology modifier, the process comprising admixing a quantity of dry coal ash and a quantity of latex polymer and a quantity of hydraulic binder and a quantity of rheology modifier to form the dispersion; wherein the mass ratio of the quantity of dry coal ash to the quantity of latex polymer is between about 0.03/1 and about 10000/1.

Further example 39. A process for forming a cementitious dispersion comprising dry coal ash, latex polymer, hydraulic binder, accelerating admixture, retarding admixture, aggregate, plasticizer and rheology modifier, the process comprising admixing a quantity of dry coal ash and a quantity of latex polymer and a quantity of hydraulic binder and a quantity of accelerating admixture and a quantity of retarding admixture and a quantity of aggregate and a quantity of plasticizer and a quantity of rheology modifier to form the dispersion; wherein the mass ratio of the quantity of dry coal ash to the quantity of latex polymer is between about 0.03/1 and about 10000/1.

Further example 40. A process for forming a cementitious dispersion comprising dry coal ash, latex polymer, hydraulic binder, accelerating admixture, retarding admixture, aggregate, filler, plasticizer and rheology modifier, the process comprising admixing a quantity of dry coal ash and a quantity of latex polymer and a quantity of hydraulic binder and a quantity of accelerating admixture and a quantity of retarding admixture and a quantity of aggregate and a quantity of filler and a quantity of plasticizer and a quantity of rheology modifier to form the dispersion; wherein the mass ratio of the quantity of dry coal ash to the quantity of latex polymer is between about 0.03/1 and about 10000/1.

Further example 41. A process for forming a cementitious dispersion comprising dry coal ash, latex polymer, hydraulic binder, accelerating admixture, retarding admixture, rheology modifier, fugitive plasticizer, plasticizing agent, super-plasticizing agent, foaming agent, de-foaming agent, pigment, dye, and alkali activating agent, the process comprising admixing a quantity of dry coal ash and a quantity of latex polymer and a quantity of hydraulic binder and a quantity of accelerating admixture and a quantity of retarding admixture and a quantity of rheology modifier and a quantity of fugitive plasticizer and a quantity of plasticizing agent and a quantity of super-plasticizing agent and a quantity of foaming agent and a quantity of de-foaming agent and a quantity of pigment and a quantity of dye and a quantity of alkali activating agent to form the dispersion; wherein the mass ratio of the quantity of dry coal ash to the quantity of latex polymer is between about 0.03/1 and about 10000/1.

Further example 42. A process for forming a cementitious dispersion comprising coal ash slurry and latex polymer, the process comprising admixing a quantity of coal ash slurry and a quantity of latex polymer to form the dispersion; wherein the mass ratio of the quantity of coal ash slurry to the quantity of latex polymer is between about 0.03/1 and about 10000/1.

Further example 43. A process for forming a cementitious dispersion comprising coal ash slurry, latex polymer and hydraulic binder, the process comprising admixing a quantity of coal ash slurry and a quantity of latex polymer and a quantity of hydraulic binder to form the dispersion; wherein the mass ratio of the quantity of coal ash slurry to the quantity of latex polymer is between about 0.03/1 and about 10000/1.

Further example 44. A process for forming a cementitious dispersion comprising coal ash slurry, latex polymer, hydraulic binder and aggregate, the process comprising admixing a quantity of coal ash slurry and a quantity of latex polymer and a quantity of hydraulic binder and a quantity of aggregate to form the dispersion; wherein the mass ratio of the quantity of coal ash slurry to the quantity of latex polymer is between about 0.03/1 and about 10000/1.

Further example 45. A process for forming a cementitious dispersion comprising coal ash slurry, latex polymer, hydraulic binder and filling material, the process comprising admixing a quantity of coal ash slurry and a quantity of latex polymer and a quantity of hydraulic binder and a quantity of filling material to form the dispersion; wherein the mass ratio of the quantity of coal ash slurry to the quantity of latex polymer is between about 0.03/1 and about 10000/1.

Further example 46. A process for forming a cementitious dispersion comprising coal ash slurry, latex polymer, hydraulic binder and rheology modifier, the process comprising admixing a quantity of coal ash slurry and a quantity of latex polymer and a quantity of hydraulic binder and a quantity of rheology modifier to form the dispersion; wherein the mass ratio of the quantity of coal ash slurry to the quantity of latex polymer is between about 0.03/1 and about 10000/1.

Further example 47. A process for forming a cementitious dispersion comprising coal ash slurry, latex polymer, hydraulic binder, accelerating admixture, retarding admixture, plasticizer and rheology modifier, the process comprising admixing a quantity of coal ash slurry and a quantity of latex polymer and a quantity of hydraulic binder and a quantity of accelerating admixture and a quantity of retarding admixture and a quantity of plasticizer and a quantity of rheology modifier to form the dispersion; wherein the mass ratio of the quantity of coal ash slurry to the quantity of latex polymer is between about 0.03/1 and about 10000/1.

Further example 48. A process for forming a cementitious dispersion comprising coal ash slurry, latex polymer, hydraulic binder, accelerating admixture, retarding admixture and rheology modifier, the process comprising admixing a quantity of coal ash slurry and a quantity of latex polymer and a quantity of hydraulic binder and a quantity of accelerating admixture and a quantity of retarding admixture and a quantity of rheology modifier to form the dispersion; wherein the mass ratio of the quantity of coal ash slurry to the quantity of latex polymer is between about 0.03/1 and about 10000/1.

Further example 49. A process for forming a cementitious dispersion comprising coal ash slurry, latex polymer, hydraulic binder, accelerating admixture, retarding admixture, rheology modifier, fugitive plasticizer, plasticizing agent, super-plasticizing agent, foaming agent, de-foaming agent, pigment, dye, and alkali activating agent, the process comprising admixing a quantity of coal ash slurry and a quantity of latex polymer and a quantity of hydraulic binder and a quantity of accelerating admixture and a quantity of retarding admixture and a quantity of rheology modifier and a quantity of fugitive plasticizer and a quantity of plasticizing agent and a quantity of super-plasticizing agent and a quantity of foaming agent and a quantity of de-foaming agent and a quantity of pigment and a quantity of dye and a quantity of alkali activating agent to form the dispersion; wherein the mass ratio of the quantity of coal ash slurry to the quantity of latex polymer is between about 0.03/1 and about 10000/1.

Further example 50. A process for formation of a dry mix suitable for subsequent formation of cementitious materials, the process comprising admixing a quantity of coal ash and a quantity of dispersible polymer powder to form the dry mix, wherein the mass ratio of the quantity of coal ash to the quantity of dispersible polymer powder is greater than unity.

Further example 51. A product useful for formation of a cementitious mixture, the product comprising a quantity of dry coal ash and a quantity of dispersible polymer powder, wherein the quantity of coal ash is not in contact with the quantity of dispersible polymer powder, and wherein the quantity of coal ash is packaged separately from the quantity of dispersible polymer powder, and wherein the mass ratio of the quantity of coal ash to the quantity of dispersible polymer powder is greater than unity.

Further example 52. A process for diminishing the adsorption capacity of a quantity of coal ash, the process comprising admixing the quantity of coal ash and a quantity of dispersible latex polymer powder, wherein the mass ratio of the quantity of coal ash to the quantity of dispersible latex polymer powder is greater than unity.

Further example 53. Diminution of the adsorption capacity of a quantity of coal ash by a process according to the invention is demonstrated by any one or more of a variety of methods known in the art.

Further example 54. Diminution of the adsorption capacity of a quantity of coal ash by a process according to the invention is demonstrated by, inter alia, a methylene blue adsorption method according to Slomka, B., Dawson, R., Buttermore, W. (Iowa State University, Ames Laboratory, Ames, Iowa 5001), Characterization of Mineral and Coal Surfaces by Adsorption of Dyes, Prepr. Pap., Am. Chem. Soc., Div. Fuel Chem., Vol. 33:4; pages 797-803; presented at the Conference: Surface chemistry of coal, Los Angeles, Calif., USA, 25-30 Sep. 1988:

> A continuous flow apparatus was developed for dynamic measurements of adsorption from liquid phases on solids. In a typical experiment, a pre-weighed sample of coal is placed in a sample cell and fixed between two 0.5 micron stainless steel fits. The sample is then connected to a six port switch valve and evacuated to remove air. The valve is set initially to direct the solution of dye to by-pass the cell containing the sample, causing it to flow directly through the ultraviolet/visible detector (Varian W-50). As soon as a baseline is established for the dye solution, the flowing solution is directed through the sample of coal to the UV/Vis detector. The absorbance measured for the effluent leaving the sample cell is due only to dye not adsorbed by the coal sample. The apparent absorbance is recorded at a fixed wavelength as a function of time using an AID converter at a sampling rate of 2 per second. This dynamic method of adsorption measurement allows for continuous replacement of the fluid phase in contact with the coal sample, which is not possible in a closed, static system. The rates of adsorption can be continuously measured as a function of time, giving characteristic profiles of adsorption rate, while the total adsorbate uptakes are obtained by integration of the rate profiles over the time of adsorption. The detector response to dye concentration [is] linear for the concentrations and wave lenghts used in the experiments. The detector [is] operated in the visible range at 610 nm. Based on preliminary results, two flow rates of solutions were selected, 1 and 0.5 ml/minute, according to the sample size of the materials tested. To evaluate the adsorptive components of coal and mineral surfaces, coal samples of uniform particle size and increasing mineral content [are] analyzed. Total mineral content [is] determined by standard ash analysis. Samples with very low ash content [are] used to approximate a non-mineral coal surface. To evaluate specific mineral adsorptive characteristics, mineral samples of uniform particle size and composition [are] analyzed. Ground coal samples of different mean particle size [are] analyzed to determine the effect of particle surface area.

Further example 55. Diminution of the adsorption capacity of a quantity of coal ash by a process according to the invention is demonstrated by a so-called "foam index" method known in the art.

Further example 56. Diminution of the adsorption capacity of a quantity of coal ash by a process according to the invention is demonstrated by a nitrogen adsorption method known in the art, such as, for example, a method described in Külaots, I., Hurt, R. H., and Suuberg, E. M., Size distribution of unburned carbon in coal fly ash and its implications, Fuel 83 (2004) 223-230.

Further example 57. Diminution of the adsorption capacity of a quantity of coal ash by a process according to the invention is demonstrated by any method according to Further examples 53, 54 and/or 55. The diminution so demonstrated is at least about 0.25%, or at least about 0.5%, or at least about 1%, or at least about 2%, or at least about 5%, or at least about 10%, or at least about 15%, or at least about 20%, or at least about 25%, or at least about 30%, or at least about 40%, or at least about 50%, or at least about 60%, or at least about 70%, or at least about 80%, or at least about 90%, or at least about 95%, or at least about 99%, or at least about 99.5%, or at least about 99.8%, or at least about 99.9%.

Further example 58. An environmentally benign cementitious product comprising coal ash, latex polymer and hydraulic binder and optionally one or more other components made by a process comprising:
 (a) admixing a quantity of coal ash with a quantity of a latex polymer to form a first mixture;
 (b) slaking the first mixture;
 (c) admixing the first mixture with a composition comprising a hydraulic binder and optionally one or more other components to form a cementitious mixture; and
 (d) slaking the cementitious mixture.

Further example 59. An environmentally benign cementitious product comprising coal ash, latex polymer and hydraulic binder and optionally one or more other components made by a process comprising:
 (a) admixing a quantity of coal ash with a quantity of a latex polymer to form a first mixture;
 (b) slaking the first mixture;
 (c) admixing the first mixture with a composition comprising a hydraulic binder and optionally one or more other components to form a cementitious mixture; and
 (d) slaking the cementitious mixture;
wherein the ratio of the mass of the quantity of coal ash to the mass of the quantity of the latex polymer is selected from the group consisting of: between about 0.03:1 and about 10000:1; between about 0.05:1 and about 8000:1; between about 0.10:1 and about 6000:1; between about 0.15:1 and about 4000:1; between about 0.20:1 and about 2000:1; between about 0.25:1 and about 1000:1; between about 0.30:1 and about 500:1; between about 0.35:1 and about 250:1; between about 0.40:1 and about 100:1; between about 0.45:1 and about 90:1; between about 0.50:1 and about 80:1; between about 0.55:1 and about 70:1; between about 0.60:1 and about 60:1; between about 0.65:1 and about 50:1; between about 0.70:1 and about 40:1; between about 0.75:1 and about 30:1; between about 0.80:1 and about 20:1; between about 0.85:1 and about 10:1; and between about 0.90:1 and about 5:1; and wherein the adsorption capacity of the quantity of coal ash in the product is diminished by a percentage selected from the group consisting of: at least about 0.25%; at least about 0.5%; at least about 1%; at least about 2%; at least about 5%; at least about 10%; at least about 15%; at least about 20%; at least about 25%; at least about 30%; at least about 40%; at least about 50%; at least about 60%; at least about 70%; at least about 80%; at least about 90%; at least about 95%;at least about 99%; at least about 99.5%; at least about 99.8%; and at least about 99.9%.

Every reference cited herein is incorporated fully by reference. To the extent that there be any conflict between the teaching of any reference and that of the instant specification, the teaching of the instant specification shall control.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a descriptive sense only and not for purposes of limitation.

The invention claimed is:

1. A process for diminishing the adsorption capacity of a quantity of coal ash, the process comprising:
 (a) admixing the quantity of coal ash with a quantity of a latex polymer to form a first mixture;
 (b) slaking the first mixture;
 (c) admixing the first mixture with a cementitious substance to form a cementitious mixture; and
 (d) slaking the cementitious mixture;
thereby persistently surrounding each of a plurality of particles of the quantity of coal ash with at least a portion of the quantity of the latex polymer, diminishing the adsorption capacity of the quantity of coal ash.

2. A process according to claim 1, wherein the quantity of coal ash is in solid form and the quantity of latex polymer is in dispersible powder form.

3. A process according to claim 1, wherein the quantity of coal ash is in slurry form and the quantity of latex polymer is in liquid dispersion form.

4. A process according to claim 1, wherein (a) at least a portion of the quantity of coal ash is in solid form and at least a portion of the quantity of latex polymer is in liquid form, or (b) at least a portion of the quantity of coal ash is in slurry form and at least a portion of the quantity of latex polymer is in dispersible powder form.

* * * * *